A. W. BRAND.
MILK CAN COVER.
APPLICATION FILED AUG. 8, 1908.

910,169.

Patented Jan. 19, 1909.

Witnesses
Albert Popkins
Mary W. Hammer

Inventor
A. W. Brand
By Sturtevant & Mason
Attorneys

UNITED STATES PATENT OFFICE.

ACHILL WALTER BRAND, OF BOISE, IDAHO.

MILK-CAN COVER.

No. 910,169.　　Specification of Letters Patent.　　Patented Jan. 19, 1909.

Application filed August 8, 1908. Serial No. 447,552.

*To all whom it may concern:*

Be it known that I, ACHILL WALTER BRAND, a citizen of the United States, residing at Boise, in the county of Ada, State of Idaho, have invented certain new and useful Improvements in Milk-Can Covers, of which the following is a description, reference being had to the accompanying drawing and to the letters and figures of reference marked thereon.

My invention relates to an improvement in covers for milk and cream shipping cans.

The object is to provide a sanitary cover for such, which is ventilated, and thus prevents the milk or cream from becoming smothered, and keeps it cooler and sweeter than in closed cans.

Other objects are to keep dust and rain from the milk, to prevent the contents from spilling when jarred; to provide a device which can be easily cleaned, and which is strong and durable.

The invention, therefore, consists in the matters hereinafter described and referred to in the appended claims.

The invention is illustrated in the accompanying drawings, in which,—

Figure 1:
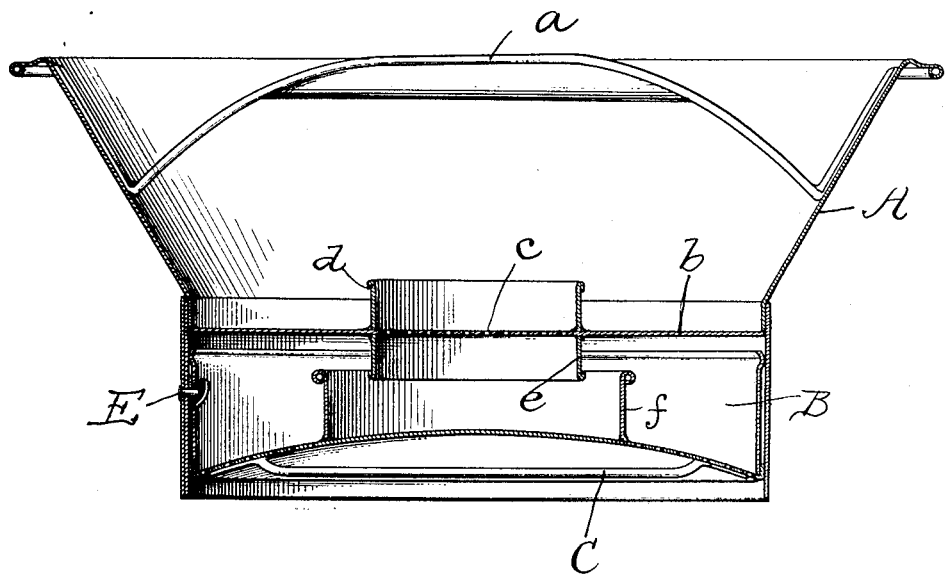
Figure 2:
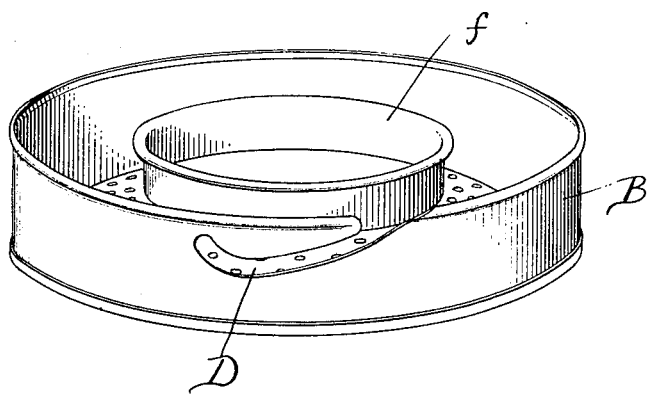

Figure 1 is a vertical section of a can cover constructed in accordance with my invention, and Fig. 2 is a view of the lower cover detached.

In these drawings, A represents the main cover formed of pressed tin, having a handle *a*. Its intermediate horizontal wall *b* is perforated, as shown at *c*, and the perforated portion is surrounded on the upper surface by a tubular projection *d*, which prevents any rain entering the ventilated cover.

A corresponding tubular projection *e*, is formed on the lower side and this is surrounded by a tubular projection *f* on the inner or lower cover B. This cover is perforated outside the tubular projection, and has a handle C on its under side. It is secured to the upper or outer cover A by having in its wall a cam slot D, engaging the pin E on the wall of the upper cover.

It will be noted that when the covers are in position, free advent of air to the milk is permitted, but rain is prevented from entering by the tubular projection *d*, and any dust which passes in through the perforations *c*, will be retained in the space between the tubular projecting walls *e* and *f*.

Having thus described my invention, what I claim as new and desire to secure by Letters Patent, is:—

1. A can closure comprising the outer cover, having a perforated portion, a tubular projection below said perforated portion, and a second perforated cover carried by said outer cover having an imperforate portion, a tubular projection surrounding the imperforate portion, and into which the tubular projection on the upper cover extends.

2. A can closure comprising the outer cover having a perforated central portion, an inner cover having a central imperforate portion, a tubular projection surrounding the same, and means for securing the two covers together whereby they form a unitary structure.

3. A can closure comprising the outer cover, having a perforated central portion with upper and lower projecting tubes surrounding the same, an inner cover having a central imperforate portion and an upwardly projecting tubular portion surrounding the imperforate portion, and into which the tubular projecting portion on the outer cover extends.

In testimony whereof I affix my signature, in presence of two witnesses.

ACHILL WALTER BRAND.

Witnesses:
　M. D. LORELL,
　T. F. HALVESTON.